May 28, 1963 W. B. JAKACKI ETAL 3,091,726
GENERATOR FOR PRODUCING SERVOMOTOR CONTROL-PULSE TRAINS
Filed Dec. 6, 1960 8 Sheets-Sheet 4

May 28, 1963   W. B. JAKACKI ETAL   3,091,726
GENERATOR FOR PRODUCING SERVOMOTOR CONTROL-PULSE TRAINS
Filed Dec. 6, 1960   8 Sheets-Sheet 6

United States Patent Office 3,091,726
Patented May 28, 1963

3,091,726
GENERATOR FOR PRODUCING SERVOMOTOR CONTROL-PULSE TRAINS

Wallace B. Jakacki, Chalfont, and Kenneth G. Harple, North Wales, Pa., assignors to Leeds and Northrup Company, Philadelphia, Pa., a corporation of Pennsylvania
Filed Dec. 6, 1960, Ser. No. 74,119
29 Claims. (Cl. 318—21)

This invention relates to systems for generating pulse trains to control the operation of stepping motors or other pulse-actuated translating devices.

In accordance with the present invention, the number of control pulses to be supplied to a translating device is preselected by setting coded bit information in a binary shift register. Gating means enabled by the bit information in the register is effective, when a Start signal is given, to pass clock pulses to the translating device as control pulses therefor and to pass shift pulses to the register until the gating means is disabled by a Stop signal occurring when the total shift of the bit information corresponds with the desired number of control pulses.

Further in accordance with preferred forms of the invention, it is provided that no more than a predetermined maximum number of control pulses can be generated for each Start signal despite such contingencies as improper loading of the shift register and failure or malfunctioning of a component of the shift register or of the gating means.

Also in accordance with a preferred form of the invention, one section of the shift register may be used to preselect which of various transating devices is to receive the number of control pulses called for by the bit information in another section of the register.

More particularly, the aforesaid arrangement for generating control pulses is used with a computer which is supplied with information concerning various process variables such as temperature, pressure, electrical generation, electrical load or the like and which from such information calculates the number of control pulses required to reset or actuate a valve, a governor or other control device in correction of deviation from some desired operating condition or to establish a desired operating condition. The result of such calculations, together with the address of a particular control device, is entered in binary code in the shift register which controls the gating means for generation, as above briefly described, of the required number of control pulses which are supplied to the addressed control device or to its local controller. When the control device is of reversible type, a directional bit is included in the binary-coded instruction entered in the shift register.

The invention also resides in pulse-generating systems having features of combination and arrangement hereinafter described and claimed.

For a more detailed understanding of the invention, reference is made in the following description of various embodiments thereof to the accompanying drawings in which.

Figure 1:
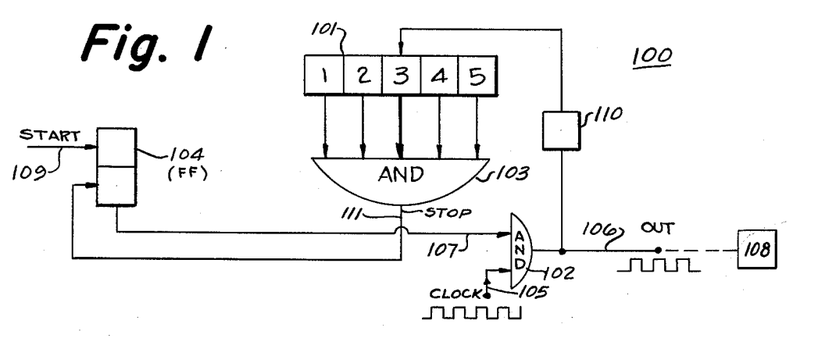
FIG. 1 is a logic diagram of a simple pulse-train generator system.

The pulse-train generating system 100 shown in FIG. 1 comprises a non-recirculating shift register 101 and gating means including an AND gate 102, an AND gate 103 whose inputs are the NOT-ONE outputs of the stages of the shift register and a flip-flop circuit 104. To the input line 105 of system 100 are applied clock pulses having for example a repetition rate of sixty per second, periodically to enable one input circuit of the AND gate 102 which is interposed between the source of clock pulses (not shown) and the output line 106 of generator 100. The other input line 107 of the AND gate 102 is enabled when the flip-flop circuit 104 is turned ON. Thus, after the flip-flop 104 is turned to the ON state, the clock pulses on input line 105 are passed by gate 102 and appear, or are repeated, as a series or train of control pulses on output line 106 for actuation of a translating device 108, which may for example be a stepping motor which changes the setting of a valve or the set point of a local controller therefor.

To predetermine the number of clock pulses which appears on the output line 106 between successive Start pulses, the shift register 101 is set or loaded with bit information in accordance with a binary code. Specifically, for the arrangement shown in FIG. 1, a single bit code is used: the "Set" position of the bit in the register 101 corresponding with the number of control pulses desired. Thus, if three control pulses are required, the third stage of the shift register is set to provide an input for the corresponding input line of the AND gate 103.

The flip-flop circuit 104 is now in condition to be turned ON when a Start signal is applied to the Start line 109. When such signal is applied, the input line 107 of AND gate 102 is enabled and each time its other input line 105 is also enabled by a clock pulse, an output pulse appears on line 106 for transmission to the translating device 108. Each of these output pulses is also applied, as through a shift driver 110, to the shift register 101 to shift the location in the register of the bit information set therein. In the arrangement shown, the shift is from right to left so that after three output pulses have been generated, the bit information has been cleared out of the register putting all inputs to the AND gate 103 in the same state.

The pulse then appearing on the Stop line 111 from AND gate 103 to the flip-flop circuit 104 is effective to disable the output line 107 of the flip-flop circuit and so close the gate 102 to preclude further transmission of clock pulses to output line 106. Thus, the number of control pulses generated by system 100 for each occurrence of a Start signal corresponds with the "Set" location in the register of the bit information.

The maximum number of control pulses obtainable in normal operation of the system of FIG. 1 will correspond with the number of stages in the shift register 101. The number of stages need not be limited to five as shown, but may be extended as desired.

With the arrangement shown in FIG. 1, there is the possibility that a continuous train or unlimited number of control pulses will be generated in event of a single failure. For example, if one of the stages of the shift register should fail, its subsequent stages in the direction of shift might be loaded with ONE bits by action of the shift-driver so that the AND gate 103 would never produce a stop signal. An unlimited number of control pulses would also be generated if the AND gate 103 should fail. Additionally, an unlimited number of control pulses would be generated upon failure of the shift driver 110, failure of flip-flop 104 to respond to a pulse on the Stop line 111 or failure of the AND gate 102 to provide the AND function.

Figure 2:
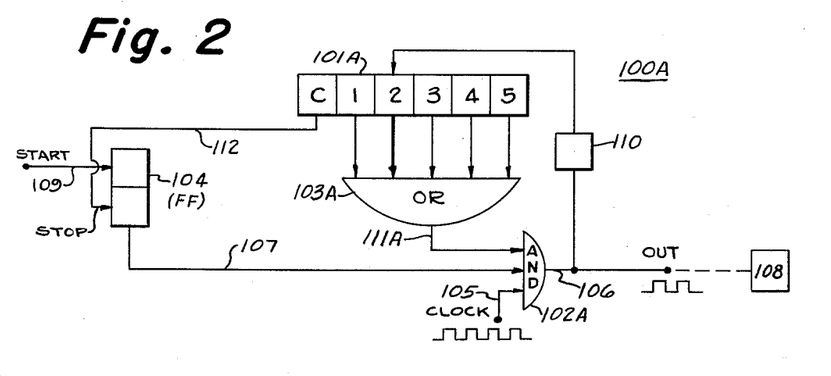
FIG. 2 is a logic diagram of another simple pulse-train generator system incorporating fail-safe features.

The arrangement shown in FIG. 2 is similar to that shown in FIG. 1 in that under normal conditions it will generate a number of control pulses corresponding with the "Set" location of bit information in a shift register but differs from FIG. 1 in that in event of many types of single failure, there is not produced an unlimited number of control pulses. In this modification, the ONE outputs of the shift register are applied to an OR gate 103A.

In FIG. 2, the AND gate 102A, corresponding with AND gate 102 of FIG. 1, has a third input line 111A from the OR gate 103A so that under normal operating conditions this gate is opened to terminate a train of control pulses when the bit information is transferred out of stage #1 by action of the shift driver 110. The shift register 101A is provided with an additional stage C whose output line 112 is connected to the flip-flop circuit 104 to reset it to the OFF state when the information bit initially set in stage #1 or one of the higher order stages is advanced by the shift driver 110 into stage C.

In normal operation, the stages of non-recirculating register 101A are loaded with binary coded bit information to clear stage C and to put a ONE in that stage corresponding with the desired number of output control pulses. Assuming for example that two control pulses are desired, stage #2 is loaded with a ONE bit to activate the corresponding input line of OR gate 103A. This enables line 111A, one of the three input lines of gate 102A. When a Start signal is applied to line 109, the flip-flop 104 is turned ON to enable line 107, a second of the three input lines of gate 102A. Then each time a clock pulse enables the third input line of gate 102A, a control pulse appears on output line 106 for transmission to a translating device and, by action of the shift driver 110, to shift the bit information in register 101A to the next stage to the left. As the bit is transferred out of stage #1 and into stage C, the OR gate 103A disables line 111A to open the AND gate 102A to preclude further passage of clock pulses to line 106 and stage C applies a pulse to line 112 to reset the flip-flop 104 to its OFF state.

If due to failure of the OR gate 103A or to failure of a stage of the register 101A the line 111A is not disabled when the desired number of control pulses has been generated, the stage C is effective to turn the flip-flop 104 to OFF and so disable the input line 107 of the AND gate 102A when stage C first receives a bit. Since this in no case can exceed the maximum stages of the shift register, the maximum number of control pulses produced after a Start signal given is definitely limited in event of a malfunction or failure of shift register 101A, OR gate 103A or flip-flop 104. The only single component failure that can result in the generation by the system of FIG. 2 of an unlimited number of control pulses is the failure of the Shift driver 110 to produce shift pulses for the shift register 101A. FIG. 2 additionally provides some check on the operation of the system supplying the coded bit information to set the shift register 101A in that if a bit is incorrectly set into the "C" position of the shift register 101A, the "Start" pulse will not initiate generation of the control pulses.

Figure 3:
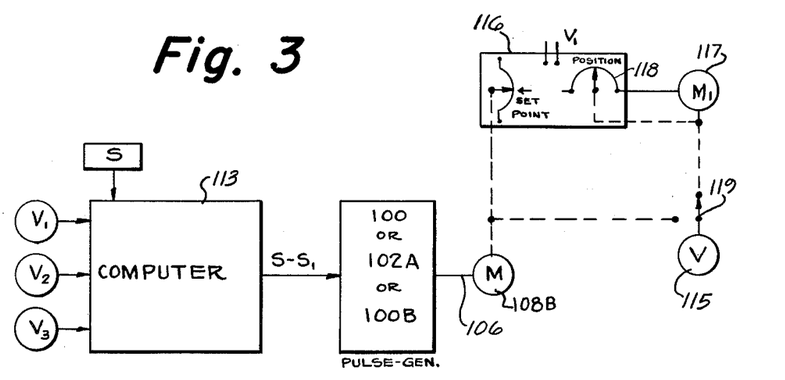
FIG. 3 is a block diagram of a computer-controlled system including a pulse-train generator system of the type shown in FIGS. 1, 2 or 4.

As above mentioned, the instruction to the pulse generator of FIG. 1 or of FIG. 2 to produce a given number of output pulses is in the form of binary-coded bit information to its shift register. As indicated in FIG. 3, such instruction is ordinarily supplied by an electronic binary computer 113 which is programmed to supply such coded instruction as the result of calculations performed with computer inputs exemplified by inputs $V_1$, $V_2$, $V_3$ representative of the existing magnitudes of various operating variables of a process or system under control. The translating device of FIG. 3 actuated by the pulse output of generator 100, 100A or of generator 100B subsequently described may be a stepping motor 108B coupled to a valve, rheostat or other control device 115 of the process or system under control. Alternatively, the stepping motor 108B may be, and preferably is, utilized to change the set point of a local controller 116 for the final control device 115. Such local controller may be of the type shown in U.S. Letters Patent 2,830,245 and 2,823,861 and includes a controller motor 117 which adjusts the valve 115 and concurrently effects a rebalancing adjustment of slidewire 118 or equivalent element of the controller 116.

In FIG. 3, the clutch 119 may couple the controlled device 115 either to the stepping motor 108B or to the local controller motor 117. In either case, the number of control pulses produced by the pulse generator per instruction from the computer 113 results in a corresponding change in setting or position of the control device 115. The position or changes in position of the control device, the set point or changes in set point of the local controller, or the number of output pulses to motor 108B may be supplied as input information to the computer 113 or stored in its memory for inclusion in the calculations upon which successive instructions to the pulse generator 100 (or 100A, 100B) are based.

Thus, the high-speed capabilities of electronic computers can be utilized to monitor the operating performance of even complex processes and systems and to provide the shift register for the pulse generator 100 (or 100A or 100B) with binary-coded instruction required for production of the proper number of control pulses to correct for deviations from a desired operating condition or to establish a new desired operating condition.

Figure 4:
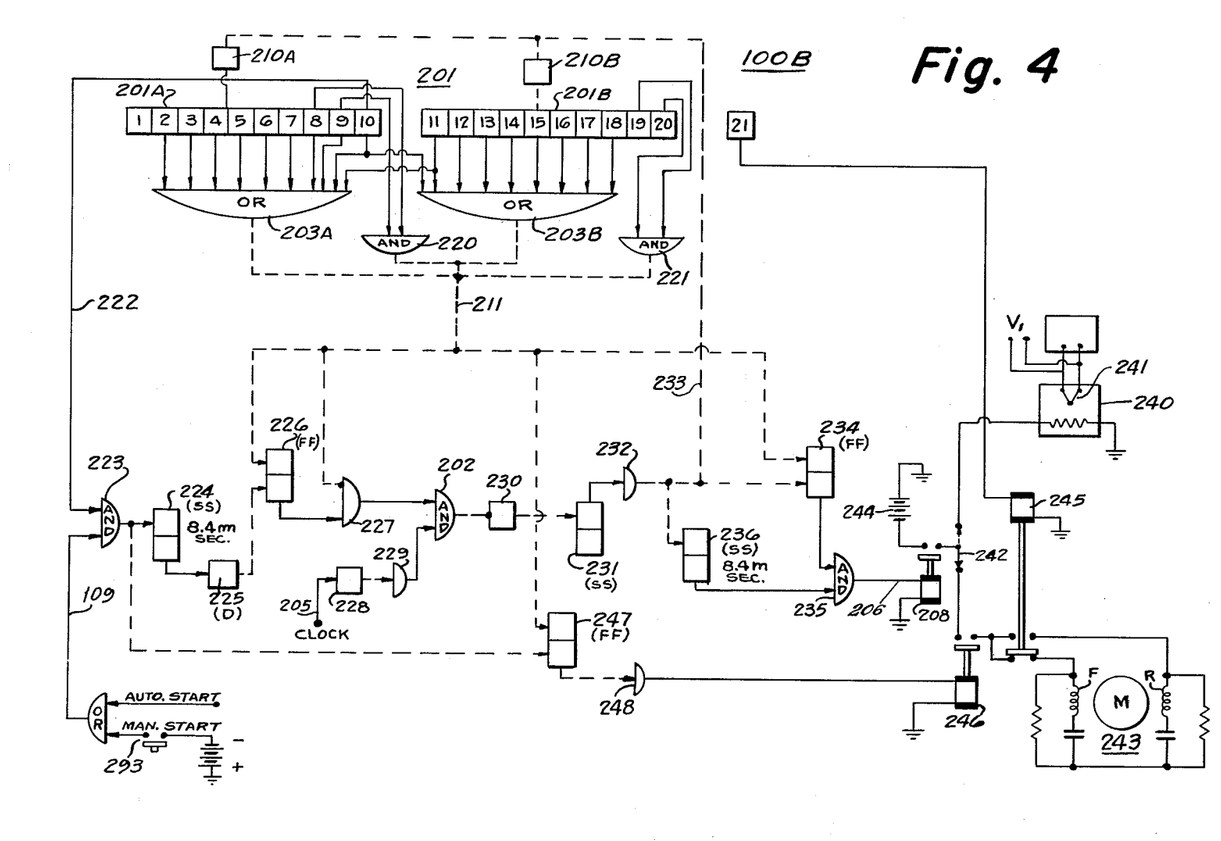
FIG. 4 is the logic diagram of the preferred form of pulse-generator system.

Although under normal conditions the control-pulse generator 100B of FIG. 4 operates in generally the same manner as those of FIGS. 1 and 2 to produce a number of control pulses predetermined by the location of bit information in its non-recirculating shift register, the associated gating means provides additional safeguards against production of pulse trains in which the number of pulses may exceed that called for by any one normal instruction and also permits time-sharing of the shift register for other uses.

Figure 5:
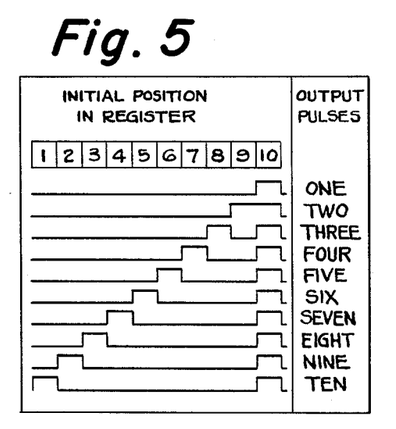
FIGS. 5, 6 and 7 are explanatory figures referred to in explanation of the operation of FIG. 4.

In this modification, the number of stages of the shift register 201 is twice the maximum number of control pulses to be normally produced by the pulse generator and is shown divided into two equal sections. When the maximum number of control pulses to be called for is ten, each section, as shown in FIG. 4, has ten stages. The pulse code used is shown in FIG. 5. The bit information is set in the first section 201A of the register and is advanced to the right one step for each shift driver pulse. The NOT-ONE outputs of stages #2 to #11 of the shift register are connected to the OR gate 203A and the NOT-ONE outputs of stages #10 to #18 of the shift register are connected to the OR gate 203B. The ONE outputs of stages #9 and #10 provide inputs for AND gate 220 and the ONE outputs of stages #19 and #20 provide inputs for AND gate 221. Thus, a Stop signal appears on the line or bus 211 when any one of the following conditions obtain:

(1) No ONES in stages #2 to #11 of shift register 201
(2) No ONES in stages #10 to #18 of shift register 201
(3) ONES in both stages #8 and #9 of shift register 201
(4) ONES in both stages #19 and #20 of shift register 201

Figure 7:
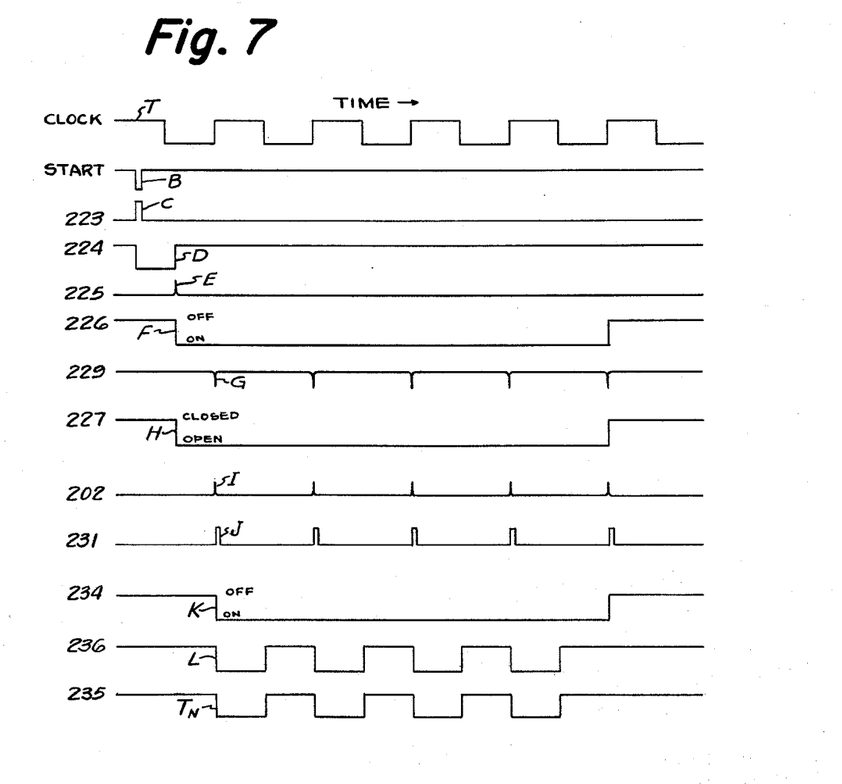

The ONE output side of stage #10 of the shift register is connected to one input line 222 of AND gate 223 so that this line is enabled when the first section 201A of the register is set in accordance with the code shown in FIG. 5 to call for any number of pulses from one to ten. The other input line for AND gate 223 is the Start line 109. Thus, with an instruction in the shift register, the application of a Start pulse B (FIG. 7) to line 109 (FIG. 4) will result in an output pulse C applied to the single-shot multivibrator 224. In its one-shot cycle, the multivibrator 224 produces an output pulse D of predetermined duration, for example 8.4 milliseconds, to allow time for connection of the translating device before arrival of control pulses. The trailing edge of pulse D is differentiated by the differentiator circuit 225 to produce a sharp trigger pulse E which as applied to the flip-flop circuit 226 is effective to turn it ON (see F, FIG. 7). With one of its input circuits enabled by the ON state of flip-flop 227 and with its other input circuit uninhibited by a Stop signal, the gate 227 is opened (see H, FIG. 7). The output of gate H thus enables one input circuit of the AND gate 202. The other input circuit of AND gate 202 is periodically enabled by the sharp timed pulses G derived from the clock pulses T continuously applied to the input line 105. Specifically, the trailing edge of the clock pulses are differentiated by the differentiator circuit 228 and then inverted by inverter 229 to produce sharp pulses G having the same repetition rate as the clock pulses.

The resulting output pulses I of AND gate 202 are differentiated by differentiator circuit 230 to provide trigger pulses I which are applied to the single-shot multivibrator 231 to produce, at clock frequency, short pulses each having for example a duration of 0.6 microseconds. These pulses, as inverted by inverter 232, form the pulses J which as supplied to the shift driver line 233 step the bit information in shift register 201 to the right.

The first pulse J as applied to the input circuit of flip-flop 234 turns it ON (see K, FIG. 7) so to enable one input circuit of the AND gate 235. The other input circuit of AND gate 235 is periodically enabled by pulses L (see FIG. 7) which are reproductions of the clock pulses T. The pulses L are the output pulses of the single-shot multivibrator 236 which is periodically triggered by the shorter output pulses J produced as above described by multivibrator 231. The resulting output of AND gate 235 as appearing on the output line 206 of the pulse generator 100B is thus, as in FIGS. 1 and 2, a train of clock pulses $T_N$ initiated by a Start signal occurring after loading of the shift register.

Figure 6:
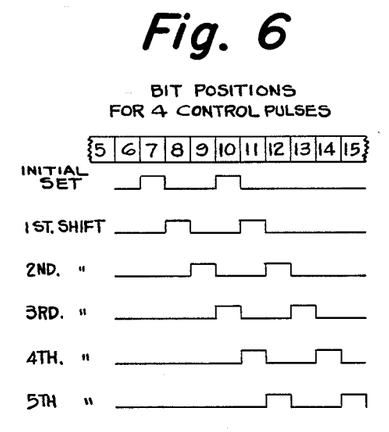

There is now described how such train of output pulses is interrupted when the number of pulses in the train corresponds with the bit information set in the first section 201A of the register. Assuming for example that four control pulses are desired on output line 206, the shift register 201 is set with a ONE in each of stages #7 and #10 (FIG. 6) in accordance with the code of FIG. 5. Since there is a ONE bit in stage #10, the AND gate 223 is effective to pass a Start signal and so open the gating means above described for appearance of clock output pulses on the output line 206. Because of the cross-connection of the NOT-ONE outputs of stages #10 and #11 to both of the OR gates 203A, 203B, these gates remain inactive for the successive shifts of the ONE bits in the register (FIG. 6) as effected by the shift pulses J until the ONE bit originally set in stage #7 has been shifted out of stage #11 by the fifth shift driver pulse. When that occurs, the OR gate 203A changes its state to produce a Stop signal on bus 211. This Stop signal as applied to flip-flop 234 returns it to its OFF state and so disables the AND gate 235 to preclude passage of further clock pulses to output line 206. Thus AND gate 235 is disabled at precisely the time that the fifth output pulse is about to be produced. As applied to gate 227, the Stop signal inhibits this gate and so disables the AND gate 202 for passage of further incoming clock pulses on input line 205: as applied to flip-flop circuit 226, the Stop signal restores it to its original OFF state in readiness for the next Start signal and also disables the lower input line of gate 227. Any one of these three actions of the Stop signal suffices to terminate the train of control pulses on line 206. Such redundancy guards against the generation of an unlimited number of output pulses in event of failure of any single component of the gating means and of many multiple failures.

A multiple failure of AND gate 220 and one stage of section 201A of the shift register in direction to fill the register with ONES will produce a Stop signal when the ONES reach AND gate 221 and produce no more than twenty control pulses for motor 243. Similarly, a multiple failure of a stage of section 201A in a direction to fill the shift register with ZEROS and of gate 203A will produce a Stop signal when the inputs to OR gate 203B are all ZEROS. Again no more than twenty control pulses would be produced for such a multiple failure. In the event of the simultaneous failure of gate 227 and flip-flops 226 and 234 or their associated components to respond to a Stop signal appearing on line 211, the normal operation of flip-flop 247 will stop the flow of control pulses to the motor 243 when a Stop signal is generated. In view of this latter provision for fail-safe operation, various combinations of these failures with failures of gates 203A, 203B, 220 and 221 previously mentioned can occur without resulting in an unlimited number of control pulses being applied to the motor 243.

The pulse generator 100B is capable of recognizing improper coding of its instructions because of malfunction of the associated computer. If, for example, the received instruction has no ONE bit in the #10 location, the AND gate 223 ignores the Start signal and no output pulses are generated. If the instruction as set in the register has two adjacent ONE bits which occupy the #8 and #9 locations of the shift register, the AND gate 220 is effective to initiate a stop signal so that no output pulses can be generated. Also if the instruction as set in the register is improperly coded with two ONE bits in any other two locations from which they are shifted by operation of the shift pulses sooner or later to arrive in the #8 and #9 positions, the AND gate 220 is effective to initiate a Stop signal so that the number of control pulses generated cannot exceed 10. Also if because of a faulty stage or malfunction of the shift register one or the other sections 201A, 201B of the shift register become loaded with ONE bits, the generation of output pulses is interrupted when such bits arrive either at locations #8 and #9 or #19 and #20 and so enable the AND gate 220 or AND gate 221 to generate a Stop signal. Again the maximum number of pulses generated for the failure of a single component before the Stop signal is given cannot exceed the maximum number called for in normal operation of the generator 100B.

Preferably and as shown in FIG. 4, the bit information is advanced in shift register 201 by two shift drivers 210A and 210B respectively driving the two sections 201A and 201B of the register. Both drivers have a common input line 233 for the shift pulses J. So long as either shift driver is operative, it is insured that a Stop signal will always be given before the number of generated output pulses exceeds the normal maximum, ten in this particular system.

In the system of FIG. 4 as thus far described, the output pulses $T_N$ on line 206 may be used for many control purposes. For example, in a simple ON-OFF control of the temperature of an electric furnace 240, the output pulses $T_N$ may be used to excite a relay or contactor 208 connected in the heater circuit of the furnace by switch 242 (dotted-line position). Assuming that a Start signal is given for each ten clock pulses T and that about five control pulses per Start signal will maintain the desired furnace temperature under normal load conditions, it will be evident that the ability of the pulse generator 100B to produce from 0 to 10 control pulses per Start signal permits a wide range of average heat input sufficient to accommodate a wide variation in furnace load. The furnace temperature may be monitored, as by thermocouple 241, so that the temperature deviations can be converted, as by the computer 113 of FIG. 3, into a coded instruction for the pulse generator 100B.

With the switch 242 in the full-line position, the pulsed relay 208 may be used to effect energization of a stepping motor 243 from a power source or line 244. Thus, the position of any control device connected to the motor may be changed in accordance with the instruction given to pulse generator 100B. For most control applications, the stepping motor 243 will be of reversible type and, as more fully discussed in connection with FIG. 8, the direction of its stepping by the output control pulses is controlled by a directional relay 245 in accordance with the instruction bit in stage #21 of the shift register. It will be noted that stage #21 does not receive pulses from the shift drivers and hence the bit information originally set into stage #21 remains there until the next bit information is set into the shift register including the bit information for stage #21.

For safety reasons, the power circuit of motor 243 or equivalent translating device also includes the contacts of a relay 246 which is energized when a Start signal is passed by gate 223 and is deenergized when a Stop signal appears for any reason on the Stop-bus 211. Specifically, when the AND gate 223 is activated, its output pulse C turns ON the flip-flop 247. The resulting output state of flip-flop 247 as inverted by inverter 248 is effective to energize relay 246 and effect closure of its contacts. When a Stop signal appears on Stop-bus 211, it is applied to the flip-flop 247 to restore it to its OFF state and so effect deenergization of relay 246. Thus, the supply of control pulses to motor 243 is interrupted even though the Stop signal, because of some component failure, is ineffective as applied to flip-flops 226, 234 and to gate 227.

Figure 8:
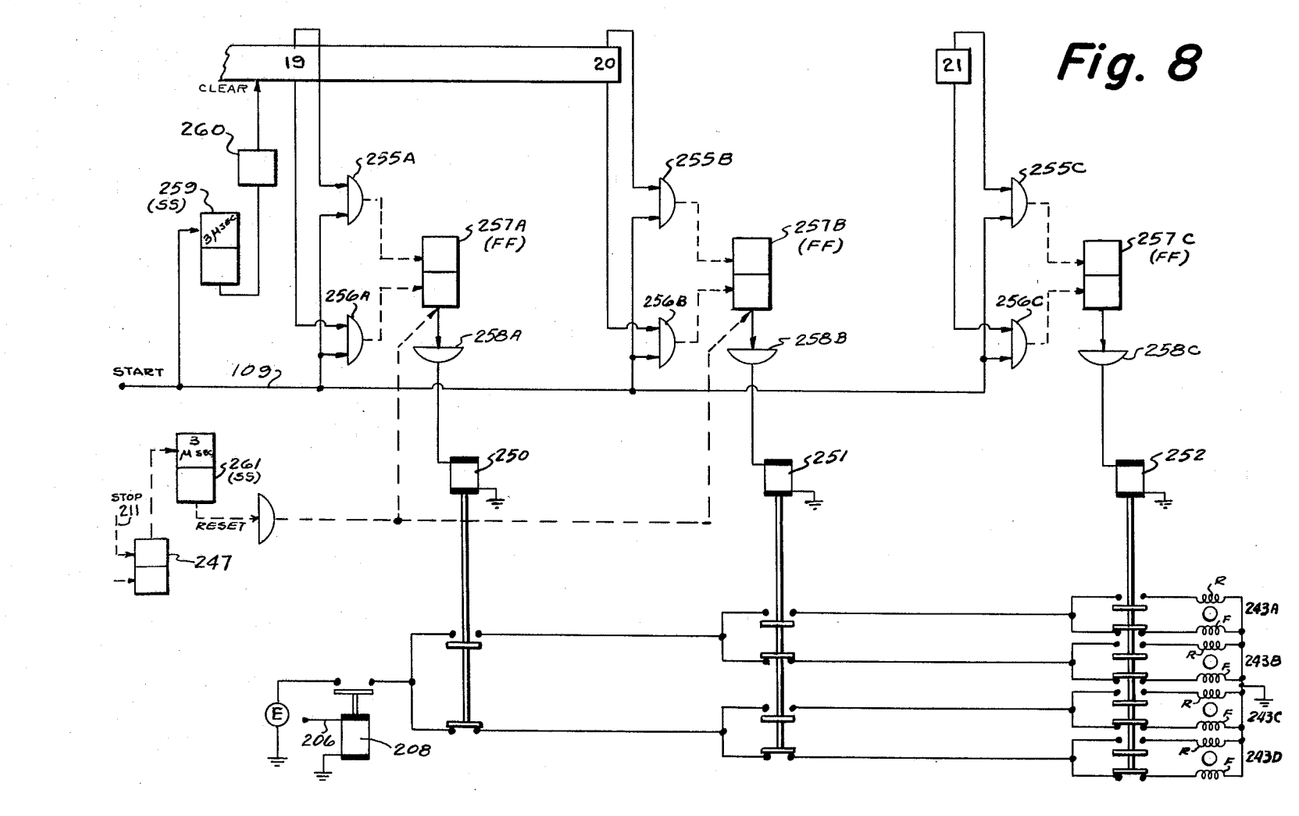
FIG. 8 is a modification of part of the system of FIG. 4 for selective energization of reversible motors.

In the system of FIG. 4 as thus far described, the second section 201B of the shift register is used only as a safety means to limit the maximum number of control pulses that could be produced by the pulse generator per Start signal. This section of the register may also be used, as will now be discussed in connection with FIG. 8, to direct the control pulses to any selected one of many stepping motors or other translating devices. With the number of stages shown for section 201B of the shift register, any one of as many as a thousand or more motors could be selected and directionally energized. For simplicity, however, FIG. 8 is limited to four reversible motors, but it will become evident to those skilled in the art that a smaller or greater number may similarly be selected and directionally controlled by a series of binary selections. As will later appear, this selective function of the shift register is completed before and does not interfere with the safety functions previously described.

With the contacts of relay 250 (FIG. 8) in the down position shown, only one or the other of motors 243C, 243D can possibly be energized when output control pulses appear on line 206, whereas if the contacts of this relay are in the up position, only one or the other of motors 243A, 243B could be pulsed. Thus, the state of stage #19 of the shift register may be set to choose between the pair of motors 243A, 243B and the pair of motors 243C, 243D. The second step of selection is effected by relay 251 in dependence upon the preset state of stage #20 of the shift register. If the contacts of relay 251 are in the down position shown, only one or the other of motors 243B, 243D could possibly be energized, whereas if the contacts of relay 251 are in the up position, only one or the other of motors 243A, 243C could possibly be energized. Thus, the concurrent states of the two stages #19 and #20 of the register predetermine which of the four motors 243A—243D is to be energized when one or more control pulses on the line 206 actuate the chopping relay 208. For example, with the contacts of relays 250 and 251 in the position shown in FIG. 8, motor 243D is the motor preselected for stepping in accordance with the instruction set in section 201A of the register. When the motors are of the reversible type, the sense of energization of the selected motor is predetermined by relay 252. With the contacts of relay 252 in down position, only the Forward windings F of the motors could possibly be energized, whereas with the contacts of relay 252 in up position, only the Reverse windings of the motors could possibly be energized. Stage #21 may be set to predetermine motor direction by controlling the state of relay 252. For the positions of the contacts of relays 250, 251 and 252 shown in FIG. 4, motor 243D is the selected motor and it will be stepped in the forward direction by the next train of control pulses.

Before a Start signal is given, the information set into the shift register includes, in addition to the information in section 201A of the register, the motor address which is set in section 201B of the register (stages #19 and #20 for the 4-motor control arrangement of FIG. 8) and the directional signal which is set in stage #21 of the register. The relay-control arrangement associated with each of these stages is of the same composition of components so that only one need be described in detail particularly since the corresponding elements of the different stages are identified by like reference characters with suffixes A, B, C respectively identifying stages #19, #20 and #21.

The ONE and NOT-ONE output sides of stage #19 are respectively connected to the upper input lines of the AND gates 255A, 256A whose lower input lines are both connected to the Start line 109. Thus, if a ONE bit is set in stage #19, the occurrence of a Start signal will produce in the output circuit of AND gate 255A a pulse which turns ON the flip-flop circuit 257A. The resulting output of this flip-flop circuit, as amplified by power amplifier 258A, is effective to energize relay 250 to move its contacts to their upper position where they remain until the flip-flop circuit 257A is turned OFF by a Reset signal produced and applied as later described. If, on the other hand, a NOT-ONE (or ZERO) bit is set in stage #19, the AND gate 256A is effective upon application of the Start pulse to maintain the flip-flop 257A in its OFF state so that relay 250 remains deenergized with its contacts in their lower position. Thus, as previously described, the relay 250 is effective to make the first step of motor selection.

In like manner, the relay 251 is controlled in accordance with the motor-address bit in stage #20 to effect the second step of motor selection and the relay 252 is controlled in accordance with the direction-bit in stage #21 to predetermine the direction in which the selected one of motors 243A—243D will run when supplied with control pulses.

Concurrently with its application to the gates 255A—255C and 256A—256C, the Start signal is applied to a single-shot multivibrator 259 which produces a short pulse of say three microseconds' duration. The trailing edge of this pulse is differentiated, as by differentiator 260, to produce a Clear pulse which clears the motor-address out of the involved section of the second stage 201B of the shift register so that it may serve, as previously described in connection with gates 203B and 221 of FIG. 4, to produce a Stop signal determining or limiting the number of control pulses produced by generator 100B in the interval between successive Start signals. When a Stop signal appears on line 211, it is effective as applied to the single-shot multivibrator 261 to produce a Reset pulse which as applied to the flip-flops 257A and 257B insures that they are turned to, or remain in, their OFF state. If, as in FIG. 4, it is desired for fail-safe purposes to disconnect all motors from the source of control pulses following the generation of a Stop signal, the motor circuit normally selected by all ZEROS in the address section 201B of the shift register, i.e. motor 243D of FIG. 8 would be eliminated.

It will be understod by those skilled in the art that the various AND gates, OR gates, flip-flops, single-shot multivibrators and other logic components of the systems described may be of any known type including those using electronic switches of the tube or transistor types. Preferably however, these logic elements as used in the system of FIGS. 4 and 8 have been of the transistor type using PNP transistors.

Figure 9:
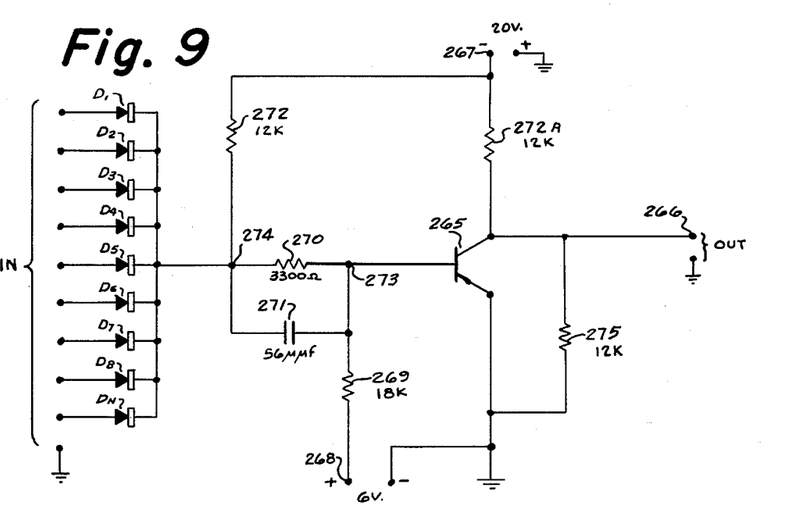
FIGS. 9 to 15 are detailed schematic diagrams of components of the system of FIG. 4.

A basic switching circuit suited for and used in logic elements of FIGS. 4 and 8 is shown in FIG. 9. It is a diode gate followed by a resistance-capacitance coupled inverter. The number of input diodes $D_1$—$D_N$ will correspond with the number of input circuits to be connected to the gate. The transistor 265 is of the PNP type with its emitter connected to ground. The transistor 265 may be of type 2N504 and the diodes may be type 5669G (Transitron). The collector of the transistor 265 is connected to the output terminal 266 and also, through resistor 272A, to the negative terminal 267 of a suitable source of direct current. The base of the transistor is connected to the positive terminal 268 of a suitable D.C. source through resistor 269 and is connected to the cathodes of the diodes $D_1$—$D_N$ through a resistor 270 which is shunted by a small capacitance 271. The resistors 269, 270 and 272 connected in series between the negative terminal 267 of the collector current source and positive terminal 268 of the base current source form a potential-divider with the common terminal 273 of resistors 269, 270 connected to the base electrode of the transistor and the common terminal 274 of resistors 270, 272 connected to the cathodes of the diodes $D_1$—$D_N$. With the base of the transistor positive with respect to the emitter, the transistor is in its OFF state and for the circuit parameters indicated, the output terminal 266 is —10 volts with respect to ground and its output is considered a negative output signal. With the base of the transistor negative with respect to its emitter, the transistor is in its ON state and the potential of the output terminal is practically zero volt with respect to ground and considered a positive output signal. Thus, when the cathode of any of the input diodes is at ground potential (i.e., a positive input to any diode), the output terminal 266 is negative with respect to ground (i.e., a negative output): under such condition, the circuit of FIG. 9 functions as an OR gate. When the cathodes of all the input diodes are negative with respect to ground, the output terminal 266 is positive with respect to ground so that under such condition the circuit of FIG. 9 functions as an AND gate. Using a single input diode, the circuit of FIG. 9 functions as an Inverter since a positive input will produce a negative output and vice versa. Thus, the circuit of FIG. 9 can and has been used for the inverters and for most of the AND and OR gates of FIGS. 4 and 8.

Figure 10:
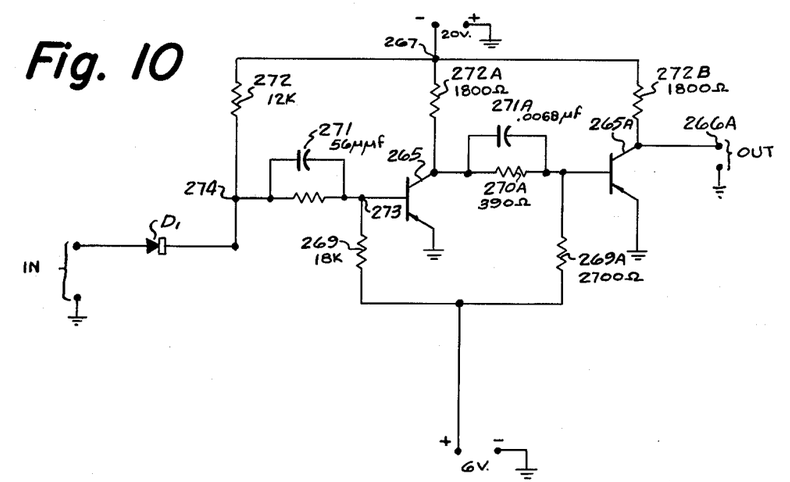

For AND and OR gates having higher power gain, as is required for gates 258A—258C of FIG. 8, there can and has been used the circuit shown in FIG. 10. As evident from inspection, this circuit is the same as that of FIG. 9 with its output fed into a similar transistor stage but with input diodes omitted from the second stage. With the circuit of FIG. 10, a positive input to any one of the diodes will cause a positive output at terminal 266A (OR function) and with negative inputs to all diodes, a negative output will appear at output terminal 266a (AND function). The circuit of FIG. 12, unlike that of FIG. 9, cannot be used as an inverter.

Figure 11:
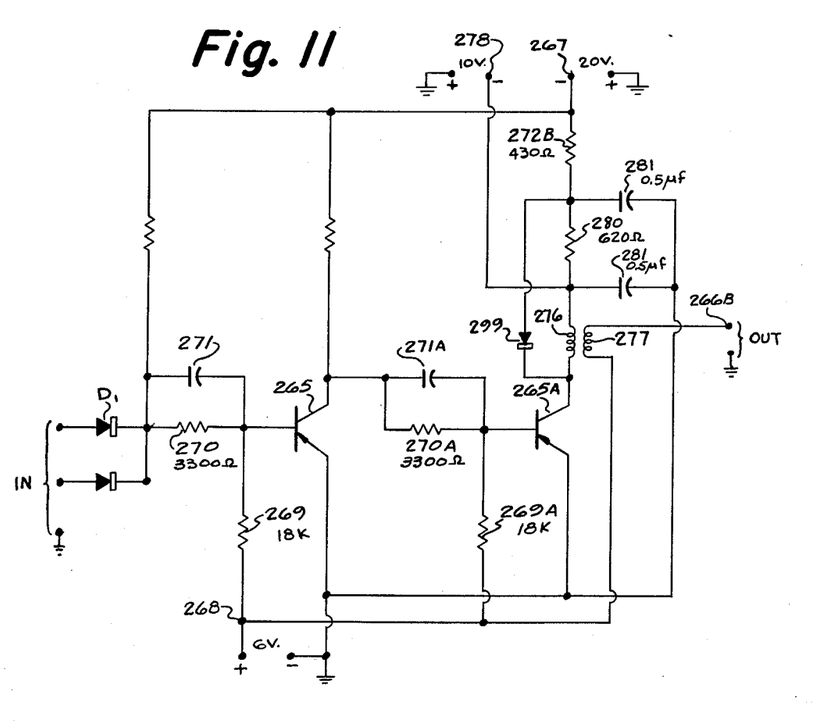

A circuit which can and has been used for the shift drivers 210A, 210B is shown in FIG. 11. This circuit is essentially the same as that of FIG. 10 except that the collector circuit of the second stage includes the primary winding 276 of a pulse transformer 277. The application of a positive input to an input diode causes a negative pulse to appear at the output terminal 266B of the secondary winding of the pulse transformer 277. A negative input level produces no output signal. The potential of the upper terminal of the primary winding 276 is referenced at a negative value, of say —10 volts, by connection to the negative terminal 278 of a voltage-stabilized source. The diode 299 connected across primary 276 and resistor 280 serves to suppress the back-kick otherwise produced when the transistor 265A is switched to the OFF state. The capacitors 281, 281 connected from opposite terminals of resistor 280 to ground serve as filter capacitors to minimize the effect of switching transients on the —20 volt source as used to supply other gates of the system.

Figure 12:
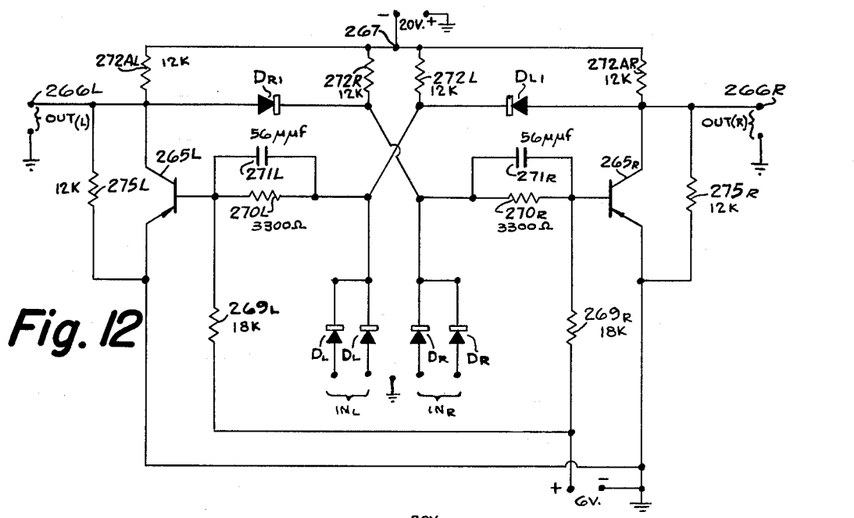

The flip-flop circuit shown in FIG. 12 consists of two basic logic gates such as shown in FIG. 9 with an input diode $D_1$ of each of them connected to the output of the other so that when either gate is turned ON, the other gate is turned OFF. Specifically, when a positive input is applied to any input diode $D_L$, a negative output will appear at output terminal $266_L$. This output of transistor $265_L$ as applied through input diode $D_{R1}$ and cross-connection $285_L$ to the base circuit of transistor $265_R$ will cause a positive output to appear on output terminal $266_R$. Conversely, when a positive input is applied to any input diode $D_R$, a negative output will appear at output terminal $266_R$. This output of transistor $265_R$ as applied through input diode $D_{L1}$ and cross-connection $285_R$ to the base circuit of transistor $265_L$ will cause a positive output to appear on output terminal $266_L$.

Figure 13:
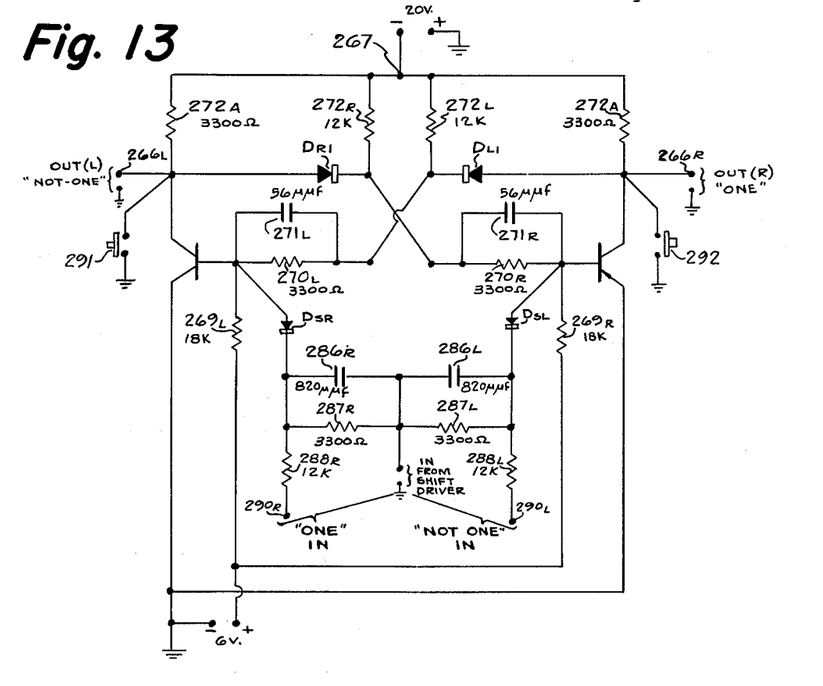

An individual shift-register stage which can and has been used in the shift register 201 of FIG. 4 is shown in FIG. 13. The circuit is similar to that of FIG. 12 except that the input diodes $D_R$, $D_L$ of FIG. 12 are replaced by a steering circuit comprising the diodes $D_{SR}$, $D_{SL}$; capacitors $286_R$, $286_L$; and resistors $287_R$, $287_L$, $288_R$ and $288_L$. Reference may be had to section 15, pages 23 to 25, 40, 41 and 54 to 57 of Hunter's Handbook of Semiconductor Electronics (McGraw-Hill Book Co.) for discussion of the theory of operation of shift registers. The shift drive pulses produced by the circuit of FIG. 12, or equivalent, are applied to input terminal 289. The ONE and NOT-ONE output terminals of the preceding stage are respectively connected to input terminals $290_R$, $290_L$ of the steering circuit.

A ONE or a ZERO may be manually set in the stage by momentary closure of one or the other of the switches 291, 292. Thus, the shift register of FIG. 4 can be manually set for generation of a desired number of control pulses, for selection of a particular motor or other device, and for selection of the direction in which the motor is to be operated by the control pulses. Thus, when a manual Start signal is given, as by closure of switch 293 of FIG. 4, the generator 100B will operate as above described and with all of the safety features.

Figure 14:
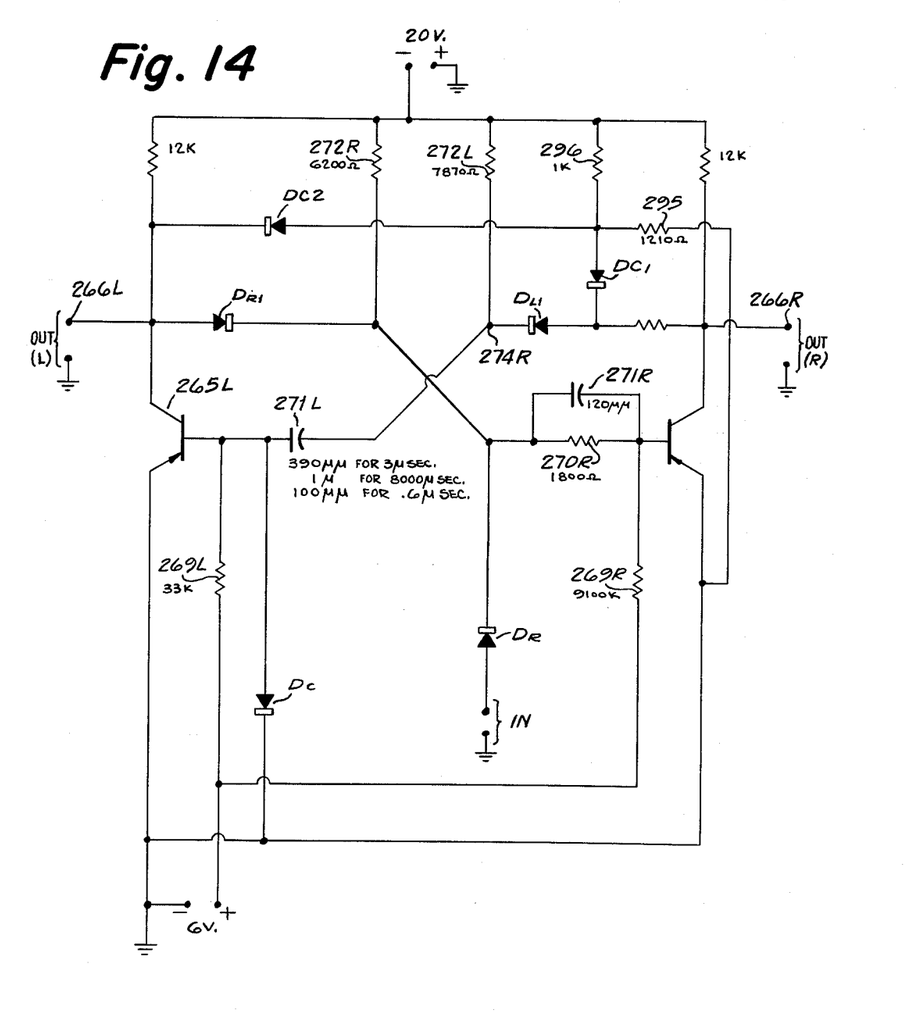

The single-shoe multivibrator shown in FIG. 14 is a conventional diode-coupled single-shot circuit with the timing network coupled to the normally-off stage. A positive input applied to the input diode $D_R$ of the normally-on stage will cause the multivibrator to go through one complete cycle providing a negative output on output terminal $266_R$ and a positive output on output terminal $266_L$ for a duration determined by the capacitor $271_L$ and resistor $272_L$. The circuit is essentially the same as that of FIG. 12 except that the base of transistor $265_L$ is clamped to ground by the diode $D_C$ and that the potential-divider circuit $269_L$, $271_L$, $272_L$, does not include a shunt resistor for the capacitor $271_L$. The potential at point $274_R$ connected to one side of capacitor $271_L$ is clamped at —10 volts by the network including diode $D_{C1}$, $D_{L1}$ and resistors 295, 296.

Figure 15:
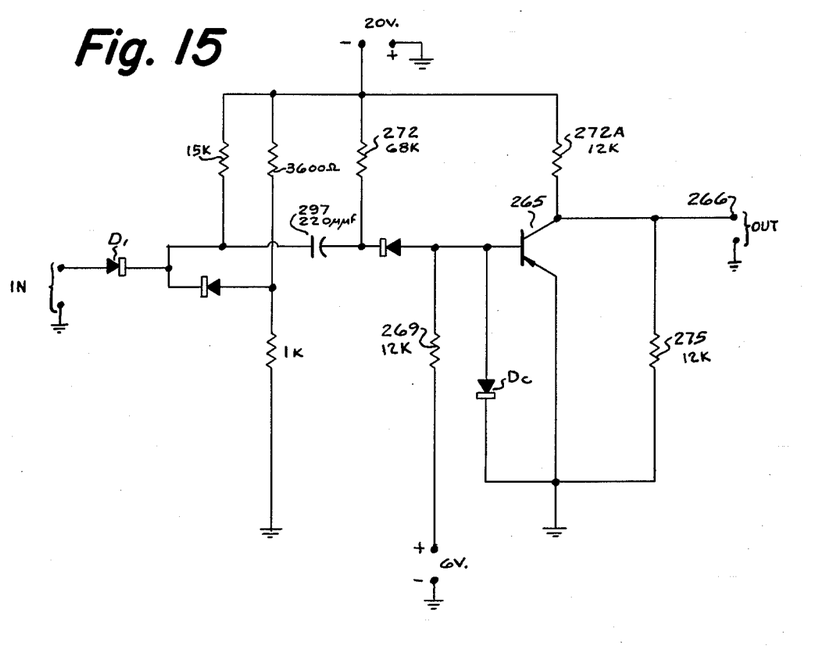

The differentiator circuit shown in FIG. 15 is basically the circuit of FIG. 9 with a differentiator circuit interposed between an input diode $D_1$ and the base of the transistor 265. A negative-going input signal produces a positive signal at output terminal 266. The potential of the base is prevented from becoming more than say about 0.3 volt positive by the clamping diode $D_C$.

It is to be understood that logic circuit elements other than those of FIGS. 9 to 15 may be used in the systems of FIGS. 1, 2, 4 and 8.

What is claimed is:

1. A system for supplying control pulses to a translating device comprising a non-recirculating shift register having stages in which information bits are set in position corresponding with a desired predetermined number of control pulses, pulse-producing means, means for producing a Start signal when said shift register is set to initiate supply of pulses produced by said pulse-producing means to said translating device and to said shift register, and means including said shift register for terminating supply of pulses to said translating device when said stages are cleared, at which time the number of pulses supplied to the translating device corresponds with the original position of the information bits as set into said stages of the register.

2. A system as in claim 1 in which there is provided means for limiting to a predetermined maximum the number of pulses supplied to said translating device after a Start signal in event of malfunctioning of any one of said means.

3. A system as in claim 1 in which the last-named means includes at least two means which are associated with different stages of the shift register and are independently capable of terminating supply of said pulses.

4. A system as in claim 1 in which means associated with the shift register recognizes improper coding of the set bit information to preclude supply of pulses to said translating device.

5. A system as in claim 1 in which means associated with the shift register recognizes improper coding of the bit information as shifted in the register to limit to a predetermined maximum the number of pulses transmitted to said translating device.

6. A system as in claim 1 in which means associated with two adjacent stages of the shift register produces a signal precluding supply of pulses to said translating device when said two stages are in a similar state inconsistent with proper coding of the bit information.

7. A system as in claim 1 in which means associated with the two adjacent stages of each pair of two separate pairs of stages of the shift register produces a signal precluding supply of pulses to said translating device when the two stages of either pair are in a similar state inconsistent with proper coding of the bit information.

8. A system as in claim 1 in which the shift register comprises at least two sections, means associated with one section of the shift register for terminating supply of pulses to said translating device, means associated with the next section of the shift register for independently terminating supply of pulses to said translating device, and independent shift driver means for the different sections of said shift register.

9. A system as in claim 8 in which the second-named means thereof is also associated with the last stage of said one section of the shift register.

10. A system as in claim 8 in which each of the independent terminating means is associated with two adjacent stages of the corresponding shift register section.

11. A system as in claim 1 in which the translating device is a reversible motor having forward and reverse windings, and in which means responsive to bit information set in at least one other stage of said shift register directs the control pulses either to the forward or the reverse winding of the motor.

12. A system as in claim 1 for control of a plurality of translating devices and in which bit information for selection of a particular translating device is set in part of the register for supply of the control pulses to the selected translating device.

13. A system as in claim 12 in which the translating devices are reversible motors each having forward and reverse windings and in which means responsive to bit information in another part of the shift register directs the control pulses either to the forward or to the reverse winding of the selected motor.

14. A system as in claim 1 in which computer means sets the bit information in the shift register and provides the Start signals.

15. A system as in claim 1 in which manually-operable switching means sets the bit information in the shift register and provides the Start signal.

16. A system as in claim 1 in which the pulse-producing means continuously produces clock signals, and in which the last-named means produces Stop signals and includes AND gating means controlled by the clock and Stop signals.

17. A system as in claim 1 in which the translating device is a stepping motor for changing the set point of the local controller of a process control device.

18. A system as in claim 17 in which computer means monitoring variables of the process controlled by said control device supplies to the shift register the bit information determining the number of control pulses to be supplied to the stepping motor, and in which the computer means provides the Start signal.

19. A system for supplying control pulses for control of a multiplicity of translating devices comprising a shift register in a first part of which information bits are set in position corresponding with a desired number of control pulses and in a second part of which information bits are set in position corresponding with a particular one of said translating devices, shift driver means for shifting the position of information bits in said shift register, pulse-producing means, means for producing a Start signal when said shift register is set first to establish a control-pulse path to said particular one of said translating devices, and then to provide for supply of pulses produced by said pulse-producing means to said path and to said shift-driver means, and means including said shift register for terminating said supply of pulses when the number of pulses supplied to the selected translating device corresponds with the set position of the information bits in said one part of the shift register.

20. A system as in claim 19 in which the last-named means includes a first gating means associated with said first part of the shift register for normal termination of the supply of control pulses, a second gating means associated with said second part of the shift register for limiting the maximum number of supplied control pulses in event of a malfunction, and means for clearing said second part of the shift register after a control-pulse path to the selected translating device has been effected for cooperation with said second gating means in limiting the maximum number of pulses to said selected translating device.

21. A system as in claim 19 in which the pulse-producing means comprises means for continuously producing clock pulses and means for reproducing said clock pulses, and in which AND gating means between the means respectively producing and reproducing the clock pulses is controlled by the continuously produced clock pulses and the Stop signal to provide fail-safe reproduction of clock pulses and fail-safe pulse input of said shift-driver means.

22. A system as in claim 21 additionally including a gate between the translating device and the means for reproducing the clock pulses and opened by the Stop signal.

23. A system for supplying control pulses to a translating device comprising a shift register in which information bits are set in position corresponding with a desired predetermined number of control pulses, means for continuously producing clock pulses, means for reproducing said clock pulses, a first gating means between said means for continuously producing clock pulses and said means for reproducing said clock pulses, a second gating means between said means for reproducing said clock pulses and said translating device, means for producing a Start signal when said shift register is set to open both of said gating means for supply of clock pulses to said translating device, and means including said shift register for producing a Stop signal applied to both of said gating means to insure termination of supply of pulses to said translating device when their number corresponds with the set position of the information bits despite failure of either gating means to respond to said Stop signal.

24. A system as in claim 23 additionally including means responsive to said Stop signal for interrupting the clock-pulse path between said second gating means and said translating device.

25. A system for supplying control pulses to a translating device comprising a non-recirculating shift register having stages in which information bits are set in position corresponding with a desired predetermined number of control pulses, pulse-producing means, means for producing a Start signal when said shift register is set to initiate generation of pulses by said pulse-producing means for supply to said translating device and to said shift register, and means including said shift register for terminating generation of pulses by said pulse-producing means when said stages are cleared, at which time the number of pulses generated corresponds with the original position of the information bits as set into said stages of the register.

26. A system for supplying control pulses to a translating device comprising a shift register in which information bits are set in position corresponding with a desired predetermined number of control pulses, pulse-producing means, and gating means opened by a Start signal when the shift register is set to pass pulses generated by said pulse-producing means to said translating device and closed when the number of passed pulses corresponds with the set position of the information bits.

27. A system for supplying control pulses to a translating device comprising a shift register in which information bits are set in position corresponding with a desired predetermined number of control pulses, means for continuously producing pulses, and gating means opened by a Start signal for passing said pulses to said translating device and also to said shift register to advance therein the position of the bit information and closed when the total advance of the bit information corresponds with the desired number of control pulses.

28. A system for controlling the position of a motor by producing pulses in number representative of the change of position desired comprising means for establishing the desired number of pulses to be applied to said motor, pulse-producing means, gating means connected to said first-named means for normally applying to said motor said desired number of pulses from said pulse-producing means, and means connected to said gating means for preventing the number of pulses to said motor from exceeding a predetermined number in the event of failure of any single component of said system.

29. A system for supplying control pulses to a translating device comprising a non-recirculating shift register having stages in which information bits are set in position corresponding with a desired number of control pulses, shift driver means for shifting said information bits in said register, pulse-producing means, means for producing a Start signal when said shift register is set to initiate supply of pulses produced by said pulse-producing means to said translating device and to said shift driver means, and means including said shift register and gating means continuously responsive to the bit information in said stages for terminating said supply of pulses when the number of pulses supplied corresponds with the original set position of the information bits.

References Cited in the file of this patent

UNITED STATES PATENTS

| | | |
|---|---|---|
| 2,817,775 | Rosenberg et al. | Dec. 24, 1957 |
| 2,852,670 | Jacques | Sept. 16, 1958 |
| 2,870,429 | Hales | Jan. 20, 1959 |
| 3,002,115 | Johnson | Sept. 26, 1961 |